Sept. 14, 1926.　　　　　　　　　　　　　　1,599,852
C. THOMAS
GAUGE DEVICE FOR RULES
Filed July 10, 1924
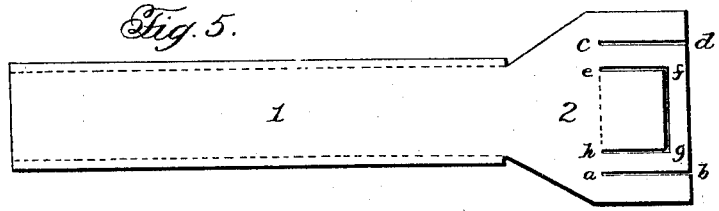
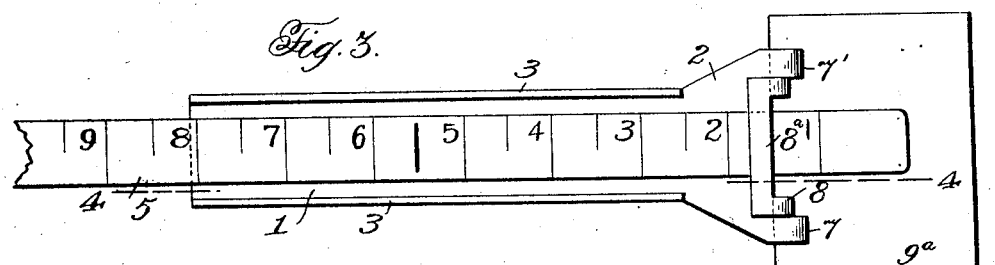
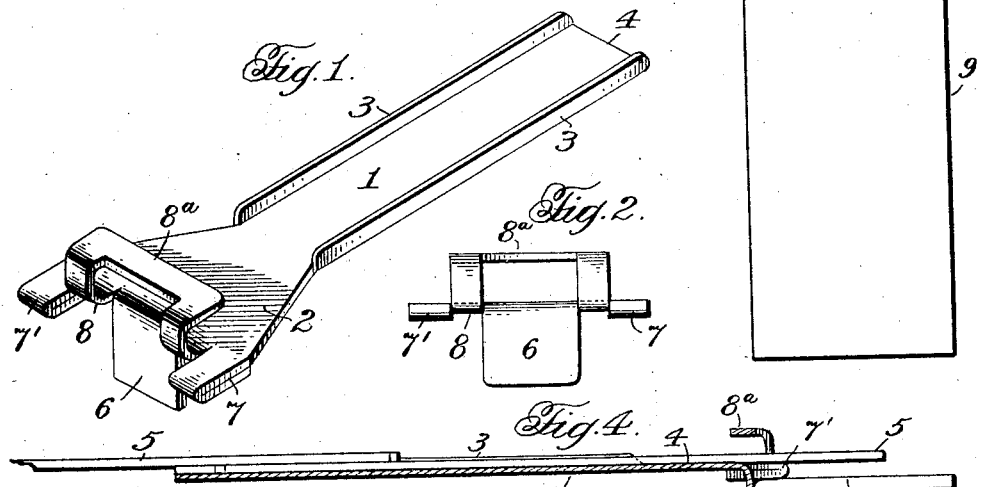
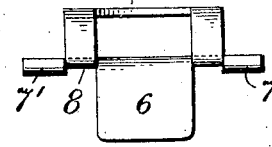
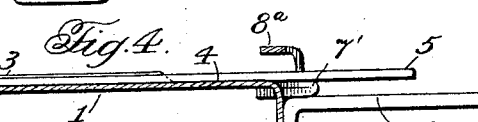
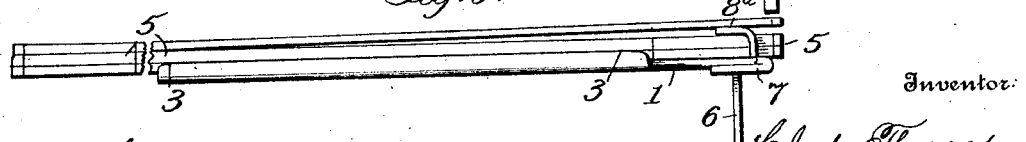

Patented Sept. 14, 1926.

1,599,852

UNITED STATES PATENT OFFICE.

CLYDE THOMAS, OF GREENVILLE, PENNSYLVANIA.

GAUGE DEVICE FOR RULES.

Application filed July 10, 1924. Serial No. 725,183.

This invention relates to improvements in gauge devices for use with carpenters' rules or the like, and has for its object to provide an improved efficient device of this kind of simple, inexpensive construction.

Important novel characteristics of the invention reside in the special construction providing for the convenient and quick adjustment of the rule relative to the gauge while holding the same in proper relationship therewith and for supporting the rule out of engagement with the work whereby scratching or marring of the same in the gauging operation is prevented.

The invention, with other objects and advantages thereof, and the particular construction, combination and arrangement of parts comprising the same will be understood from the hereinafter contained detail description, when considered in connection with the accompanying drawing, forming part hereof, and illustrating one embodiment of the invention.

In the drawings:

Figure 1 is a perspective view of the gauge device constructed in accordance with the present invention.

Fig. 2 is a front end elevation.

Fig. 3 is a plan view of the device with a rule, the same being shown engaging an angle iron in engaging or marking position relative thereto.

Fig. 4 is a part side elevation and part section of the device in operative relation with an angle iron.

Fig. 5 is a plan view of a blank from which the device is formed.

Fig. 6 is a side view of the device and a rule packed together.

The invention comprehends a device comprising a main body part provided with a longitudinally extending rule channel, a flange at one end theerof extending at right angles thereto to the side thereof opposite that at which the rule channel is located, and adapted to engage an edge of the work, and portions at either side of said flange extending forwardly thereof to engage the face of the work to be gauged or marked. The invention further comprehends a construction of this nature provided with a guide loop or portion located at the forward end of the body part to hold the rule in position, and the provision of the body part of a length to be gripped sidewise by the hand with the thumb resting against the said loop and rule, whereby the device and rule can be firmly held and the rule quickly and easily adjusted.

Referring to a detail description of the particular embodiment of the invention illustrated in the drawings, the particular construction shown consists of a flat plate having an elongated rectangular shaped part 1 with an enlarged part 2 at one end. The part 1 has oppositely disposed longitudinally extending flanges 3 providing at one side of the plate a channel 4 in which is adapted to fit and slide a rule 5 of any suitable form, that shown being one of the conventional types of folding rule. The enlarged part 2 has at its under side a flange 6 extending transversely thereof and at right angles thereto, 7, 7', are portions extending forwardly from the part 2 at either side of the flange 6. 8 designates a loop on the enlarged part 2 extending transversely of the channel 4 with its opening in line therewith, the upper portion 8$^a$ of the loop 8 serving to maintain the rule 3 in position within the channel 4 but being spaced a sufficient distance above the plane of the channel to permit of freely sliding the rule therein in adjusting the same.

The elongated rectangular shaped part 1 is of a length sufficient to provide a firm grip sidewise thereof by the hand with the thumb resting partly upon the portion 8$^a$ of the loop 8 and the rule 5, this construction providing for conveniently holding the gauge device and rule, and the quick and easy adjustment of the latter.

As illustrated in Figures 3 and 4, in use, the gauge device is positioned with the flange 6 engaging one side edge or face of the work 9, this being shown in the present exemplification as an angle iron strip, with the portions 7, 7', resting upon the face 9$^a$ of the work which is to be marked or gauged, the portions 7, 7', being of a thickness to support the forward portion of the rule free from the surface 9$^a$ of the work, the gauge device with the rule, adjusted as desired, being moved along the work and the work marked off in accordance with the regular practice.

The channel 4 is preferably of a width to accommodate rules of different widths, in the present instance, the same being shown of slightly greater width than the rule 5.

The particular construction of gauge device shown in the drawings is constructed from a single or continuous piece or blank of any suitable sheet metal (see Figure 5). The flanges 3 are formed by bending up marginal portions of the part 1. The part 2 is provided with longitudinal cuts or slits along the lines a—b, c—d; longitudinal cuts along the lines e—f, g—h, and a transverse cut along the line f—g. The portions separated and lying outside of the lines a—b, c—d are folded back upon themselves, to form the portions 7, 7′, said portions being of a thickness double that of the thickness of the metal of the blank. The portion bounded by the lines e—f, g—h, is folded down to form the flange 6, and the remaining portion separated by the several cuts or slits is folded back at the upper side of the plate to form the loop 8.

When not in use the rule 5 and gauge device are adapted to be arranged compactly together for carrying in the pocket, as illustrated Figure 6, end portions of folded sections of the rule 5 being disposed below the upper portion 8ª of the loop 8, which may be slightly resilient and serve as a clamp to retain the rule in this position.

It will be noted that the special construction hereinbefore described, affords a gauge device of simple construction that can be produced at low cost, the device being of an efficient nature providing for the convenient holding of the same, the quick and easy adjustment of the rule, and the construction being such that in the gauging operation the gauge device will have a firm bearing upon the work and the rule will be supported free of the surface of the work so that scratching or marring of the rule is prevented.

While a specific embodiment of the invention is illustrated in the drawings, it will of course be understood that changes and variations in the particular construction shown, and the carrying out of the invention in other forms as will appeal to those skilled in the art and falling within the scope of the appended claims, may be practiced without departing from the spirit of the invention. Instead of constructing the device from a single continuous piece or blank of sheet metal by slitting and bending up portions of the blank, the invention also comprehends forming the device by molding or casting.

What I claim is:—

1. A gauge device comprising a body part provided with a longitudinally extending rule channel at the upper side thereof, a flange at one end thereof extending at right angles thereto at the under side thereof to engage an edge of the work, and portions extending forwardly of said flange at right angles thereto to rest upon the face of the work to be marked, said portions being disposed at either side of the rule channel out of alignment therewith.

2. A gauge device comprising a substantially rectangular shaped part provided with a longitudinally extending rule channel at the upper side thereof, a flange at the under side thereof at one end extending at right angles thereto, and a loop at one end thereof adjacent said flange extending transversely of the channel with its opening in line therewith, said loop having a flat portion extending in line with the central part of the channel and adapted to be engaged by the thumb, and said rectangular shaped part being of a length to afford a firm grip sidewise thereof by the hand with the thumb resting upon the said flat portion of the loop.

3. A gauge device constructed from a single piece of sheet metal comprising an elongated rectangular shaped part having longitudinal flanges providing a rule channel at the upper side thereof, an enlarged end part provided within the margin thereof with longitudinal slits and a transverse slit intersecting the longitudinal slits, the part of the head within the bounds of said slits being bent to provide a right angle flange depending from the under side thereof, and a part of said head outwardly of said slits being bent to provide a transversely extending loop portion at the upper side of the body.

4. A gauge device constructed from a single piece of sheet metal comprising an elongated rectangular shaped part having longitudinal flanges providing a rule channel at the upper side thereof, an enlarged end part provided within the margin thereof with a pair of longitudinal slits and a transverse slit intercepting said longitudinal slits, and also with longitudinal slits at either side of the first mentioned longitudinal slits, the part of the head within the boundary of the first mentioned longitudinal slits and transverse slit being bent to provide a right angle flange depending from the under side of the body, the part of the head outside of the first mentioned slits and within the boundary of the second longitudinal slits being bent to provide a transversely extending loop portion, and the portions of the head lying to the outer side of the second mentioned longitudinal slits providing forwardly extending portions at either side of said flange and loop adapted to engage a face of the work.

5. A gauge device constructed from a single piece of sheet metal comprising an elongated rectangular shaped part having longitudinal flanges providing a rule channel at the upper side thereof, an enlarged end part provided within the margin thereof with a pair of longitudinal slits and a transverse slit intercepting said longitudinal slits and also with longitudinal slits at either side of the first mentioned longitudinal slits, the part of the head within the boundary of the first mentioned longitudinal slits and transverse slit being bent to provide a right angle flange depending from the under side of the body, the part of the head outside of the first mentioned slits and within the boundary of the second longitudinal slits being bent to provide a transversely extending loop portion, and the portions of the head lying to the outer side of the second mentioned longitudinal slits being doubled back upon themselves and providing portions of double thickness extending forwardly beyond and at right angles to said flange.

In testimony whereof I hereunto affix my signature.

CLYDE THOMAS.